Patented Feb. 3, 1953

2,627,297

UNITED STATES PATENT OFFICE 2,627,297

MOISTURE RESISTANT COMPOSITIONS OF RESINS AND FIBROUS FILLERS

Carl Robert Faelten, Milwaukee, Wis., assignor to Pittsburgh Plate Glass Company, Allegheny County, Pa., a corporation of Pennsylvania No Drawing. Application May 18, 1946, Serial No. 670,832

4 Claims. (Cl. 154—2.6)

The present invention relates to thermosetting resins embodying a non-reactive filler and notably a filler of a fibrous or filamentary nature, and it has particular relation to resins of the foregoing type which can be cast from liquid ingredients adapted to polymerize to a solid infusible state even under little or no mechanical pressure.

One object of the invention is to provide a resinous body comprising a non-reactive filler of fibrous nature, said body being highly resistant to permeation by moisture.

A second object is to provide a resinous body containing a filamentary filler, said body being highly resistant to the passage of electrical current even under conditions of high humidity.

A third object is to provide an electrically non-conductive, moisture resistant resinous body comprising a fibrous or filamentary filler or reinforcement in a matrix obtained by polymerizing primary ingredients which are capable of being molded and cured to desired state at low pressures.

A fourth object is to provide a resinous material containing a non-reactive filler or reinforcement, each particle or fiber of said filler or reinforcement being completely coated with an individual moisture resistant film, said fibers further being imbedded in a continuous phase resinous matrix.

These and other objects of the invention will be apparent from consideration of the following specification and the appended claims.

It has heretofore been proposed to provide panels and other bodies useful in the electrical arts as insulation by appropriately impregnating a fibrous filler or a fabric such as asbestos, cotton, paper or glass with a suitable polymerizable compound or mixture adapted to set to form a resinous binder imparting rigidity and impermeability to the fibrous material. Difficulty has been experienced in obtaining adequate electrical resistance to these materials, particularly under conditions of high humidity, apparently because the individual fibers were inadequately coated or "wet" by the resinous medium. Moisture tended to follow along the individual threads or fibers wherever they were inadequately coated thus providing paths of low resistance for electrical current which in time often lead to failure of the insulative body or at least was conducive to excessive power losses. The difficulty was not so pronounced in the resins requiring high pressures in the curing operation, since the pressure forced the liquids into intimate contact with the individual fibers. However, in connection with insulative materials comprising fibrous or filamentary fillers and reinforcements imbedded in matrices of the thermosetting resins formed from polymerizable liquid components which cure even at low pressures the problem was serious. Under the conditions involved in curing these polymerizable liquids the pressures were inadequate completely to force the liquids through and about the fibers.

One highly meritorious class of resins capable of curing from the liquid to the solid thermoset state under relatively low pressures but being likely incompletely to impregnate fibrous fillers and reinforcements comprises the copolymers of olefinic monomer and certain polyesters formed by esterification of an olefinically unsaturated alpha beta dicarboxylic acid and a dihydric alcohol. The alkyd or polyester base of this type of resin may be either in liquid or solid state and usually includes a series of olefinically unsaturated carbon atoms corresponding to the residues of the unsaturated dicarboxylic acids. In each instance the olefinic bond is conjugate to the carbon to oxygen double bond of a carboxyl so that the polyester molecule includes a plurality of the carbon-oxygen conjugate groups (—C=C—C=O). In general the polyesters are of linear structure and, as previously stated, are either in liquid or solid phase.

In order to cure the polyesters into a thermosetting resin, they may be combined with a polymerizable olefinic monomer such as styrene, divinyl benzene, methyl methacrylate, or the bis allyl carbonate of glycols of Patent 2,379,251, vinyl acetate, or diallyl phthalate. These monomers react to provide cross-linkages or netting effects between the linear polyester molecules. The preparation of thermoset resins by reaction of a polyester of an unsaturated acid and a glycol and an unsaturated olefinic monomer is discussed in an article by John B. Rust in "Industrial and Engineering Chemistry," January 1940, page 64, and again in an article by E. L. Kropa and T. F. Bradley in "Industrial and Engineering Chemistry," December 1939, page 1512.

These resins are of excellent di-electric properties and a high resistance to permeation by moisture. They are also readily cured at comparatively low temperatures and by application of very light pressures, in most instances only sufficient pressure to impart desired form to the resin bodies. These properties would seem desirable in the preparation of fiber reinforced electrically insulative bodies, such as panels for supporting electrical conductors and instrumentalities or for covering electrical conductors and similar applications. For example, it would seem desirable to employ the polymerizable mixtures of liquid polyesters and an olefinic monomer to impregnate fabrics, such as rayon, glass fibers, or to impregnate other fibrous materials to provide reinforced sheets or bodies of excellent di-electric properties. Such resins would also seem suitable for impregnating sheets of fabric which were subsequently to be laminated to provide relatively thick sheets or bodies of insulative material. However, in actual practice difficulty has been experienced in the formation of such insulative compositions. In spite of the resistance of the resin to moisture, humidity was found substantially to effect the insulative character of the material because of the previously described tendency of the moisture to follow along the fibers. Wherever a thread or fiber was inadequately covered or wet by the resins, paths for the entrance of moisture were provided. The moisture followed along these paths thus reducing the insulative value of the material. Ultimately, under conditions of heavy service, failure of the insulative material or excessive power losses were likely to result.

In accordance with the provisions of the present invention, it has been discovered that if the fibrous materials constituting a reinforcement for the di-electric materials herein discussed are preliminarily subjected to treatment with a polymer of styrene or methyl styrene, the foregoing difficulties are substantially eliminated. Apparently, the polystyrene in solution effectively impregnates and coats the fibrous material so that each individual fiber is provided with a protective casing or covering of polystyrene which is highly resistant to the action of moisture. The coated fibers can be easily introduced into or impregnated by the polymerizable mixtures and the resultant fiber-polymerizable ester mixture can easily be cured into highly non-conductive moisture resistant bodies by the application of moderate heat even without application of appreciable pressure. The polystyrene coating on the fibers also has the function of fusing with the polymerizable material to form a moisture resistant adhesive bond.

In the preparation of a polyester suitable for addendum copolymerization with a polymerizable monomer containing a functioning olefinic bond in accordance with the provisions of the present invention, various $\alpha\beta$ ethylenically unsaturated $\alpha\beta$ dicarboxylic acids and various dihydric alcohols may be employed. Similarly tetrahydrophthalic acid or endomethylene tetrahydrophthalic acid (or their anhydrides) which do not contain carbon-oxygen conjugation can be employed. Maleic acid (or its anhydride) and fumaric acid are classic examples of alpha-beta olefinically unsaturated alpha-beta dicarboxylic acids suitable for use in the preparation of the polyesters. It will be obvious, however, that other alpha-beta unsaturated, alpha-beta dicarboxylic acids or other acids including the carbon-oxygen conjugately unsaturated group may be employed. It will be apparent that the unsaturated open chain dicarboxylic acids may also be in part replaced by a functionally saturated dicarboxylic acid, such as phthalic acid or tetrachlorophthalic acid, or adipic acid. These functionally saturated acids may be employed, for example, in equi-molar ratio with respect to the functionally unsaturated dicarboxylic acid. The functionally saturated dicarboxylic acids may also be employed in a ratio up to 5 or 6 mols with respect to the unsaturated dicarboxylic acid. These latter type products tend to be highly flexible and for certain purposes are of considerable utility.

The glycols may include diethylene glycol, triethylene glycol, tetraethylene glycol, 1,3 or 1,2 propylene glycol or dipropylene glycol and similar dihydric compounds adapted to react with dicarboxylic acids to form polyesters.

The preparation of the polyesters may proceed in accordance with conventional principles in the preparation of esters. Usually the dicarboxylic acid or acids (or their anhydrides) are admixed with the dihydric alcohol in approximately molar ratio through some variation (e. g. 10 to 20%) is permissible and the mixture is mately molar ratio though some variation (e. g. a period of several hours (e. g. 15 or 20) up to a temperature of about 180 to 250° C. or other reaction temperatures below the point of undue volatilization or degradation of the mixture. Heating should be continued until an acid value preferably not greater than 100 is attained. The acid value may go considerably lower than the foregoing figure though usually it will be above 10 because of a tendency of the polyester to set or gel if heating is unduly prolonged. An acid value of 30 to 50 would appear to be a good average.

The ratio of styrene to polyester is susceptible of much variation, for example, within a range of 10 to 60 parts by weight per 100 parts of the polyesters.

The polymerizable mixtures of polyesters and polymerizable olefin monomer may be incorporated immediately with a suitable catalyst of addendum polymerization, such as benzoyl peroxide, tertiary butyl hydroperoxide, cyclohexyl hydroperoxide, acetyl peroxide, lauroyl peroxide or the like. Aldehyde-amine or aldehyde-ammonia reaction products such as are employed in the rubber industry as accelerators of vulcanization may also be employed. The ratio of catalysts is susceptible of much variation, for example within a range of 0.1 to 5 per cent based upon the total amount of the reactive ingredients in the mixture. Of course, the catalyst should be introduced just before the mixture is to be applied and cured, otherwise, premature gelation is likely to occur. If it is desired to preserve the polymerizable mixtures over substantial periods of time, for example, in order to permit shipment or for purposes of maintaining a reserve of material in storage, it may be desirable to add an inhibitor of polymerization. Such inhibitor as trimethylbenzyl ammonium chloride or phenyl hydrazinehydrochloride constitute good inhibitors and are effective even in exceedingly minute amounts, for example in a ratio of .0005 per cent. These inhibitors are added to the polyesters before the addition of the olefinic compound. Higher amounts, e. g. 1 or 2 per cent may be employed if desired. These inhibitors will protect the polymerizable mixtures from gelation over long periods of time but when a suitable catalyst of polymerization such as one of those above mentioned is added and the mixture is heated, it readily polymerizes or cures to the final thermoset stage.

The fillers or reinforcements which have been preliminarily coated with a solution of polystyrene may be incorporated with the polymerizable mixtures at any desired stage, but usually incorporation will shortly precede the final curing operation. The polymerizable mixture may be spread upon polystyrene treated fabrics such as fabrics of rayon, nylon, asbestos, cotton, spun-glass or the like or the fabrics may be dipped into the liquid mixture of polyester and monomer. Individual sheets of such materials may be cured to provide impregnated sheets suitable for insulation between conductors or for wiring. A plurality of such sheets may also be laminated together to provide panels of greater rigidity and thickness. It will be apparent that loose fibers and short pieces of threads pre-treated with a solution of polystyrene may also be admixed in any desired ratio with the polymerizable mixtures and then molded or sheeted out in any desired manner and cured by application of heat and such slight pressures as may be required to maintain the desired shape of the mixtures while they are fluid.

In the curing of the polymerizable mixture, temperatures within a range of about 75° up even to 250° C. or indeed any reaction temperature below the charring or sintering point of the resin or the filler may be employed. Temperature of about 115 to 160° C., would appear to be satisfactory in most instances. The curing operation will usually be completed within a period of 1 to 60 minutes. A good average would be approximately 3 to 10 minutes.

The following examples are illustrative of the application of the principles of the invention:

Example I

A fabric of synthetic plastic fibers was saturated by immersing for one minute in a solution of polystyrene in toluol. The solution was prepared as follows:

100 parts (by weight) toluol
5 parts (by weight) polystyrene of soluble grade

The above ingredients were stirred together and warmed at 120° F. until the polystyrene had completely dissolved. After immersion the fabric was festooned in an oven, dried for ½ hour at 167° F. and ½ hour at 250° F. to volatilize the solvent and form a coating of polystyrene on the surface of the filaments and threads of the fabric.

The coated fabric was then immersed in a resin composition of the following formula for a period of 15 minutes:

45 parts (by weight) styrene
115 parts (by weight) of a polyester formed by esterification of molar proportions of propylene glycol and maleic anhydride
1.6 parts (by weight) benzoyl peroxide.

The saturated fabric was then cut into pieces and stacked. The stacks were placed between heated steel plates at about 5 pounds per square inch pressure at 250° F. for 30 minutes to convert the contact pressure resin to the infusible state. The panels exhibited a resistance of 400,000 megohms at 500 volts between electrical posts ⅜" apart under conditions of high humidity and high and low temperature after a 10-cycle test (1 cycle consisting of 160° F. for 16 hours and at −70° F. for 4 hours at 95% relative humidity).

Example II

For purposes of comparison a fabric similar to that of Example I was merely immersed in a resin composition of the following formula for a period of 15 minutes:

By weight—
45 parts styrene
115 parts (formed by esterification of molar proportions of propylene glycol and maleic anhydride)
1.6 parts benzoyl peroxide The saturated fabric was then cut into pieces and stacked. The stacks as in Example I, were cured between heated steel plates at about 5 pounds per square inch pressure at 250° F. for 30 minutes to convert the contact pressure resin to the infusible state. After 1 cycle (16 hours at 160° F. and 4 hours at −70° F. at 95% humidity) the sample exhibited a much lower resistance of 0.56 megohm at 500 volts between electrical posts ⅜" apart. Thus, it is apparent that with a pretreatment as in Example I the laminates produced have a greater electrical resistance than when the pretreatment is omitted.

Example III

A nylon fabric was precoated with a solution of polystyrene in xylol. The solution was prepared as follows:

100 parts of xylol
10 parts of polystyrene

The above ingredients were warmed and stirred together at 120° F. until the polystyrene had completely dissolved. After immersion the fabric was hung to dry in a ventilated room for 2 hours, after which it was festooned in an oven for 15 minutes at 250° F. to completely evaporate the volatile solvent.

The coated fabric was then immersed in resin composition of the following formula:

By weight—
30 parts diallyl phthalate
50 parts of a polyester formed from diethylene glycol and maleic anhydride in molar proportions
3 parts benzoyl peroxide The saturated fabric was then cut into pieces, stacked and subjected to a pressure of 5 pounds per square inch between two heated steel plates at 250° F. for 30 minutes to convert the contact pressure resin to the infusible state. The panel thus made exhibited outstanding electrical resistance at high humidity.

In preparing solutions of polystyrene for impregnating the fabrics or fibers substantially any ratio of solvent commensurate with adequate fluidity of the solution is permissible. Any solvent of polystyrene such as chlorinated hydrocarbons can be employed in place of xylol.

By application of the principles of the invention it is possible to provide electrically insulative sheets, panels, tubes, tapes, coatings appropriately reinforced with fabric sheets or loose fibers or threads and which will operate satisfactorily over long periods of time even under excessively humid conditions. The fibers or threads treated with polystyrene form a strong union with the polyester-olefinic monomer mixtures to provide mechanically strong bodies.

The forms of the invention herein disclosed are to be regarded as illustrative rather than limiting. It will be apparent to those skilled in the art that numerous modifications may be made therein without departing from the spirit of the invention or the scope of the following claims.

I claim:
1. A moisture resistant panel comprising a plurality of plies of fabric formed of fibers, said fibers being individually coated with polystyrene, said plies being impregnated with and bonded together to form said panel by means of a thermoset resin obtained by copolymerizing with a peroxide a mixture consisting essentially of (A) a polyester of a glycol and a material of a class consisting of an alpha-beta ethylenic, alpha-beta dicarboxylic acid and a mixture consisting of said acid and a dicarboxylic acid free of ethylenic unsaturation, the two acids being in the relative proportions of 1 mole of the former to 1 to 6 moles of the latter and (B) an ethylenic monomeric compound copolymerizable with the polyester, said copolymer being strongly united with the polystyrene coated fibers.

2. A panel as defined in claim 1 in which the ethylenically unsaturated monomer is styrene.

3. A moisture resistant panel comprising a plurality of plies of fabric formed of fibers, said fibers being individually coated with polystyrene, said plies being impregnated and firmly bonded together to form said panel by means of a thermoset resinous peroxide polymerized matrix of a copolymer of a mixture of (A) a polyester of a glycol and an alpha-beta ethylenic, alpha-beta dicarboxylic acid and (B) an ethylenic monomer copolymerizable with the polyester.

4. A moisture resistant panel comprising a plurality of plies of fabric formed of fibers, said fibers being individually coated with polystyrene, said plies being impregnated with and bonded together to form said panel by a thermoset resinous perxide polymerized matrix which is a copolymer of (A) a polyester of a glycol and a mixture of dicarboxylic acids consisting of an alpha-beta ethylenic, alpha-beta dicarboxylic acid and a dicarboxylic acid free of ethylenic unsaturation, the two acids being in the relative proportions of 1 mole of the former to 1 to 6 moles of the latter and (B) an ethylenically unsaturated monomer copolymerizable with the polyester.

CARL R. FAELTEN.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,212,400 | Letteron | Aug. 20, 1940 |
| 2,255,313 | Ellis | Sept. 9, 1941 |
| 2,466,597 | Kropscott et al. | Apr. 5, 1949 |
| 2,477,407 | Grant et al. | July 26, 1949 |